United States Patent [19]

Aiba et al.

[11] 4,420,612

[45] Dec. 13, 1983

[54] CATALYST MEMBRANE

[75] Inventors: Seiichi Aiba; Kazuhisa Hiratani, both of Yatabe; Tsutomu Nakagawa, Musashino, all of Japan

[73] Assignee: Director Genereal of Agency of Industrial Science & Technology, Tokyo, Japan

[21] Appl. No.: 470,640

[22] Filed: Feb. 28, 1983

Related U.S. Application Data

[62] Division of Ser. No. 339,741, Jan. 15, 1982, abandoned.

[30] Foreign Application Priority Data

Jan. 19, 1981 [JP] Japan .................................... 56-6072

[51] Int. Cl.³ ............................................ C08B 31/00
[52] U.S. Cl. .............................. 536/102; 260/239.3 R; 260/404; 260/415; 521/84.1; 521/139; 536/1.1; 536/103; 562/607; 564/215; 564/216
[58] Field of Search .......................... 536/102, 103, 1; 260/239.3 R; 521/84, 139; 260/404, 415

[56] References Cited

U.S. PATENT DOCUMENTS 3,247,133 4/1966 Chen .
3,257,334 6/1966 Chen et al. .
3,901,874 8/1975 Hill ..................................... 536/102
4,012,303 3/1977 D'Agostino et al. .

Primary Examiner—Morton Foelak
Attorney, Agent, or Firm—Stephen F. K. Yee

[57] ABSTRACT

A catalyst membrane including a porous polytetrafluoroethylene membrane having grafted thereon polystyrenesulfonic acid. The catalyst membrane is useful for hydrolyzing water soluble organic substances such as polysaccharides.

7 Claims, 2 Drawing Figures

F I G. 1
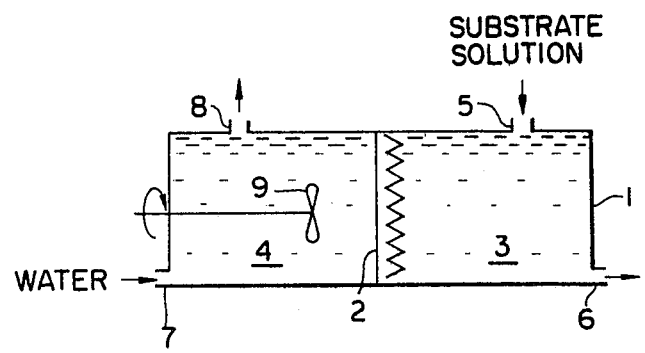
F I G. 2
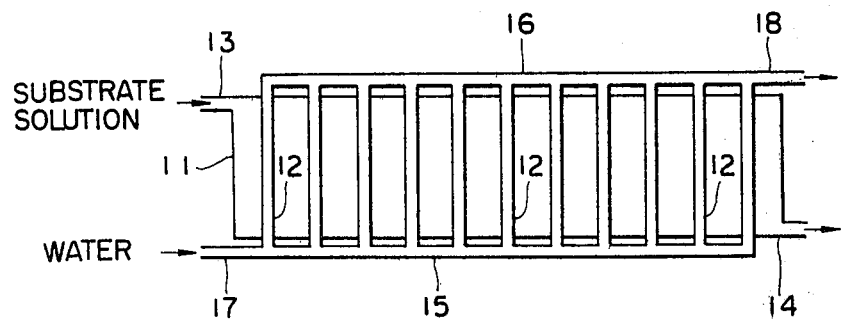

CATALYST MEMBRANE

This is a division of application Ser. No. 339,741, filed Jan. 15, 1982 now abandoned.

BACKGROUND OF THE INVENTION

This invention relates to a catalyst in the form of a membrane and, more particularly, to a catalyst membrane capable of catalyzing hydrolysis.

A variety of catalysts such as mineral acids and enzymes have been employed for the hydrolysis of water-soluble organic substances such as carboxylic acid esters, amides and polysaccharides. (The substance to be hydrolyzed will be hereinafter referred to simply as substrate). Known catalysts, however, have a drawback that, with them, it is difficult to separate the product of the hydrolysis from the substrate and the catalyst.

SUMMARY OF THE INVENTION

It is, therefore, an object of the present invention to provide a hydrolysis catalyst which is devoid of the above-mentioned drawback of the conventional catalysts.

Another object of the present invention is to provide a catalyst in the form of a membrane having a high hydrolytic activity, an excellent resistance to chemicals and a high mechanical strength.

It is a further object of the present invention to provide a catalyst membrane with which the hydrolyzed product may be successively and selectively separated from the substrate as the hydrolysis continues.

In accomplishing the foregoing objects, there is provided in accordance with the present invention a catalyst membrane which includes a porous polytetrafluoroethylene membrane having grafted thereon polystyrenesulfonic acid.

In another aspect of this invention, there is provided a process for the preparation of a catalyst membrane, which includes the steps of: providing a polytetrafluoroethylene membrane, grafting polystyrene on the polytetrafluoroethylene membrane, and reacting the membrane having polystyrene grafted thereon with a sulfonating agent to incorporate sulfonic acid groups into the benzene nuclei of the grafted polystyrene.

In a further aspect, the present invention provides a method of hydrolyzing acid-catalyzable, water soluble organic substances with the use of the above catalyst membrane.

BRIEF DESCRIPTION OF THE DRAWING

Other objects, features and advantages of the present invention will become apparent from the detailed description of the invention which follows, when considered in light of the accompanying drawing in which:

FIG. 1 is a diagrammatic illustration showing an apparatus for performing the hydrolysis using the catalyst membrane of this invention; and FIG. 2 is a diagrammatic illustration showing another example of the apparatus for effecting the hydrolysis.

DETAILED DESCRIPTION OF THE INVENTION

The catalyst membrane according to the present invention is composed of a fluid-permeable, porous membrane formed of polytetrafluoroethylene and having grafted thereon polystyrenesulfonic acid. The catalyst membrane is considered to have a chemical structure schematically represented by the following formula:

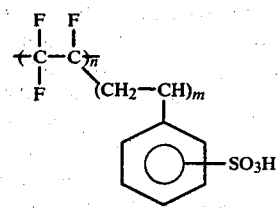

The graft ratio of the catalyst membrane is generally in the range of about 10 to 100%, preferably in the range of about 15 to 200%. The term "graft ratio" herein means a ratio by weight of the grafted polystyrene to the polytetrafluoroethylene. The graft ratio may be roughly regarded as a molar ratio of the styrene monomer unit to the tetrafluoroetylene monomer unit in view of their similarity in molecular weight. A graft ratio below about 10% is insufficient to provide suitable amount of sulfonic acid group which is to be bonded to the polystyrene and which serves as a catalytic component of the catalyst membrane. Above 1000% graft ratio, the pore diameters of the catalyst membrane become so small that the practically acceptable rate of separating the hydrolysis product cannot be obtained.

The catalytic activity of the catalyst membrane depends upon the amount of the sulfonic acid groups on the benzene nuclei of the polystyrene grafted on the polytetrafluoroethylene. It is preferred that the catalyst membrane have a sulfonic acid group content of 0.01 to 1.0 millimol per square centimeter of the area of one side surface of the catalyst membrane.

The catalyst membrane of this invention may be suitably obtained by a process including the steps of providing a pervious, porous polytetrafluoroethylene membrane, grafting polystyrene on the polytetrafluoroethylene membrane, and incorporating sulfonic acid groups into the benzene nuclei of the grafted polystyrene.

In order to obtain a catalyst membrane having both a high catalytic activity and a good separating effect, it is advisable to use a polytetrafluoroethylene membrane having a thickness of 30-200μ, an average pore diameter of 0.1-1.2μ and a perviousness such that air can pass through the membrane at a flow rate of about 0.85 to 16 liters per min. per square centimeter of the membrane at 25° C. In this regard, it is preferred that the volume of pores with diameters of 0.1-1.2μ has at least 60% of the total pore volume of the polytetrafluoroethylene membrane. The most preferable membrane is that the volume of pores with diameters of 0.1-0.22μ has at least 70% of its total pore volume. Commercially available polytetrafluoroethylene membranes such as "Fluoropore FP010, FP022, FP030, FP045, FP065, FP080, FP100 and FP120" made by Sumitomo Denki Kogyo Kabushiki Kaisha, Japan and "Goretex" made by Gore Inc., U.S.A. may be suitably employed for the preparation of the catalyst membrane of this invention.

The polytetrafluoroethylene membrane is grafted with polystyrene. The grafting is conveniently effected by way of γ ray irradiation techniques, though other methods such as an ultraviolet light irradiation method may also be adopted. Styrene monomer is dissolved in a suitable solvent such as benzene or tetrahydrofuran to form a solution having a styrene concentration of 10-99% by weight, preferably 50-90% by weight. The tetrafluoroethylene membrane is then immersed in the solution, which is subsequently exposed to γ ray in an absorbed dose of 0.1-8.8 Mrad (megarad), preferably 0.8-8.0 Mrad at a temperature of 10°-70° C., preferably 15°-40° C., whereby the styrene monomer is polymerized with the simultaneous grafting on the polytetrafluoroethylene. The graft reaction is carried out so that the resulting membrane has a graft ratio of about 10 to 1000%, preferably about 15 to 200%. After the irradiation, the membrane is washed with suitable washing liquid or liquids such as benzene, toluene and tetrahydrofuran to remove unreacted monomer and nongrafted styrene polymers. The washed membrane is then reacted with a sulfonation agent to incorporate sulfonic acid groups into the benzene nuclei of the polystyrene. Examples of the sulfonation agent include chlorosulfonic acid and fuming sulfuric acid.

The catalyst membrane according to the present invention is advantageously used as catalyst for hydrolyzing a variety of acid-hydrolyzable, water-soluble substances such as carboxylic acid esters, amides and polysaccharides. Illustrative of the esters are ethyl acetate, butyl acetate, γ-butylolactone, ε-caprolactone and higher fatty acid esters. Illustrative of the amides are ε-caprolactum, dimethylformamide, dimethylacetoamide and higher fatty amides. Illustrative of the polysaccharides are starch, dextrin and amylose. The catalyst membrane of the present invention is most advantageously applied for the hydrolysis of polymeric substances having a molecular weight of 1000 to 50000, such as polysaccharides.

The hydrolysis of the substrate using the catalyst membrane of this invention will now be described with reference to the accompanying drawing. FIG. 1 is a cross-sectional, elevational view diagrammatically illustrating an apparatus suitable for conducting the hydrolysis. Designated by the reference numeral 1 is a cylindrical reaction vessel whose inside space is divided by a membrane 2 into two axially aligned, contiguous first and second chambers 3 and 4. The membrane 2 is formed of the above-described catalyst membrane.

An aqueous solution containing a substrate to be hydrolyzed is continuously supplied to the first chamber 3 through an inlet 5 and discharged therefrom through an outlet 6. If desired, the discharged solution may be recycled to the chamber 3. The second chamber 4 is continuously supplied with water through an inlet 7, into which the hydrolysis product is diffused through the membrane 2. The water with the hydrolysis product diffused therein is continuously withdrawn from the chamber 4 for recovery through the outlet 8. The optimum concentration of the substrate in the feed solution varies according to the kind thereof, but generally in the range of 1-100 g/l. In the case of a polysaccharides, the concentration may be 1-50 g/l, preferably 10-30 g/l.

The substrate, when contacted with the surface of the membrane 2 or when admitted into the pores of the membrane 2, is converted into small molecules through hydrolysis by the catalytic action of the sulfonic acid groups bonded to the membrane 2. The thus formed small molecules can pass through the membrane 2 and diffuse into the water in the second chamber 4. To facilitate the diffusion of the hydrolysis product into the water in the chamber 4, it is preferred that the chamber 4 be provided with an agitator 9 for stirring the water therein. Designated at 10 is a heater for heating the substrate solution so as to accelerate the hydrolysis.

FIG. 2 is an alternate embodiment of the hydrolysis reactor. A cylindrical vessel 11 has an inlet 13 through which a solution containing a substrate is continuously fed thereto and an outlet 14 through which the solution is discharged therefrom. Disposed in the vessel 11 are a multiplicity of axially extending hollow tubular fibers 12 formed of the catalyst membrane of this invention. The inside diameter of each fiber may be 1 mm or less. The lower and upper ends of the tubes 12 are connected to a common inlet chamber 15 and a common outlet chamber 16, respectively. Indicated as 17 and 18 are inlet and outlet for water, respectively. When water is continuously introduced into respective tubes 12, the hydrolysis product diffuses through the pores of the wall of the tubes 12 into the water flowing in the tubes 12 in the manner as described with reference to FIG. 1. This embodiment is suitable for large-scale production of hydrolysis product.

By using the catalyst membrane according to the present invention, the hydrolysis of the substrate proceeds very fast and, moreover, the product of the hydrolysis is successively separated from the substrate. For example, when a polysuccharide is subjected to hydrolysis, its glucoside bonds are dissociated during its passage through the catalytic membrane by the action of the sulfonic acid groups on the surface of the membrane and the inside surfaces of the pores of the membrane, whereby mono and oligosaccharides are collected and recovered as an aqueous solution.

The following examples will further illustrate the product invention.

EXAMPLE 1

Commercially available porous polytetrafluoroethylene membranes produced by Sumitomo Denki Kogyo K.K. and having average pore diameters shown in Table 1 were used for the preparation of catalyst membranes. Each of the polytetrafluoroethylene membranes was circular in shape and had a thickness of 50μ and a diameter of 9 cm. Each membrane was immersed in a 50 wt % solution of styrene in benzene and was exposed, in its entirety, to γ ray in an absorbed dose of 0.8 Mrad at room temperature in the atmosphere of nitrogen. The membrane was then taken out of the irradiated mixture and was washed with benzene for the removal of the polystyrene components which failed to graft on the polytetrafluoroethylene. The washed membrane having grafted thereon polystyrene was immersed in a 2 wt % solution of chlorosulfonic acid in tetrahydrofuran to effect sulfonation at room temperature for 10 hours. The resulting membrane was washed successively with glacial acetic acid, water, acetone and water again whereby to obtain the catalyst membrane. The thus obtained catalyst membranes exhibited good hydrophilicity and become transleucent upon absorbing water. The graft ratio and the sulfonic acid group-content of each catalyst membrane were as shown in Table 1.

TABLE 1

| Catalyst membrane | No. 1 | No. 2 | No. 3 | No. 4 |
|---|---|---|---|---|
| Average pore diameter (μ) | 0.1 | 0.22 | 0.65 | 1.20 |
| Graft ratio (%) | 17.7 | 17.5 | 17.6 | 16.5 |
| Content of sulfonic acid group (millimol/cm$^2$)* | 0.011 | 0.014 | 0.011 | 0.010 |

*A value obtained by dividing the total amount (in terms of millimol) of sulfonic acid groups by the area ($\pi \times 4.5^2$ cm$^2$) of the membrane.

EXAMPLE 2

The same kind of porous polytetrafluoroethylene membranes used in Example 1 were also used in this example. Each membrane was immersed in a 20 wt % solution of styrene in benzene and was exposed, in its entirety, to γ rays in an absorbed dose of 8.0 Mrad. The resulting membrane was treated in the same manner as in Example 1 whereby to obtain catalyst membrane. Each of the catalyst membrane had a graft ratio and a sulfonic acid group-content as shown in Table 2.

TABLE 2

| Catalyst membrane | No. 5 | No. 6 | No. 7 | No. 8 |
|---|---|---|---|---|
| Average pore diameter (μ) | 0.10 | 0.22 | 0.65 | 1.20 |
| Graft ratio (%) | 74.4 | 75.2 | 72.5 | 72.7 |
| Content of sulfonic acid group (millimol/cm$^2$) | 0.043 | 0.021 | 0.030 | 0.031 |

The catalyst membrane No. 5 obtained in this example was immersed in an aqueous dextrin solution and allowed to stand at 75° C. for 10 hours. Thin layer chromatographic analysis revealed that the resulting solution contained glucose.

EXAMPLE 3

Hydrolysis of dextrin was conducted using the catalyst membrane No. 2 obtained in Example 1. A cylindrical vessel having 400 ml inside volume was used as a reactor. The inside of the vessel was divided by the membrane into two chambers having almost the same inner volume. One of the two chambers was filled with distilled water while the other chamber was filled with an aqueous solution containing 25 g/l of dextrin. The water was occasionally sampled to examine the amount of the hydrolysis product accumulated therein. The results are shown in Table 3.

TABLE 3

| Time (hr) | 0.6 | 1.1 | 1.9 | 3.9 | 5.5 | 7.5 | 10.0 |
|---|---|---|---|---|---|---|---|
| Amount of hydrolysis product (mg) | 1.2 | 2.0 | 4.1 | 10.2 | 17.2 | 26.6 | 31.0 |

From the results shown in Table 3, it will be appreciated that the hydrolysis product increases in amount with the lapse of time. The production rate is about 0.7 g/h per one square meter of the catalyst membrane. The hydrolysis product contained about 40% by weight of glucose and the balance of maltose, maltotriose, maltotetraose and other oligosaccharides.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A method of hydrolyzing an acid-catalyzable, water soluble organic substance, comprising contacting a solution containing said substance with a catalyst membrane which comprises a porous polytetrafluoroethylene membrane having grafted thereon polystyrenesulfonic acid, wherein said porous polytetrafluoroethylene membrane has a thickness of 30 to 200 u and an average pore size diameter of 0.1 to 1.2 u.

2. A method as set forth in claim 1, wherein said solution is contacted with one side of said catalyst membrane, with the other side thereof being contacted with water so that the hydrolysis product may diffuse through said catalyst membrane into said water.

3. A method as set forth in claim 1, wherein said catalyst membrane is prepared by a process comprising the steps of:
   providing a porous polytetrafluoroethylene membrane;
   grafting polystyrene on said polytetrafluoroethylene membrane; and
   reacting said membrane having polystyrene grafted thereon with a sulfonating agent to incorporate sulfonic acid groups into the benzene nuclei of the grafted polystyrene.

4. A method as set forth in claim 3, wherein said porous polytetrafluoroethylene membrane has a perviousness such that air can pass therethrough at a flow rate of about 0.85–16 liters per min. per square centimeter of said membrane at 25° C.

5. A method as set forth in claim 1, wherein said organic substance is a carboxylic acid ester, an amide or a polysaccharide.

6. A method as set forth in claim 5, wherein said organic substance has a molecular weight of 1000 to 50000.

7. A method as set forth in claim 6, wherein said organic substance is a fatty acid ester, a fatty amide, starch, dextrin or amylose.

* * * * *